Patented May 31, 1927.

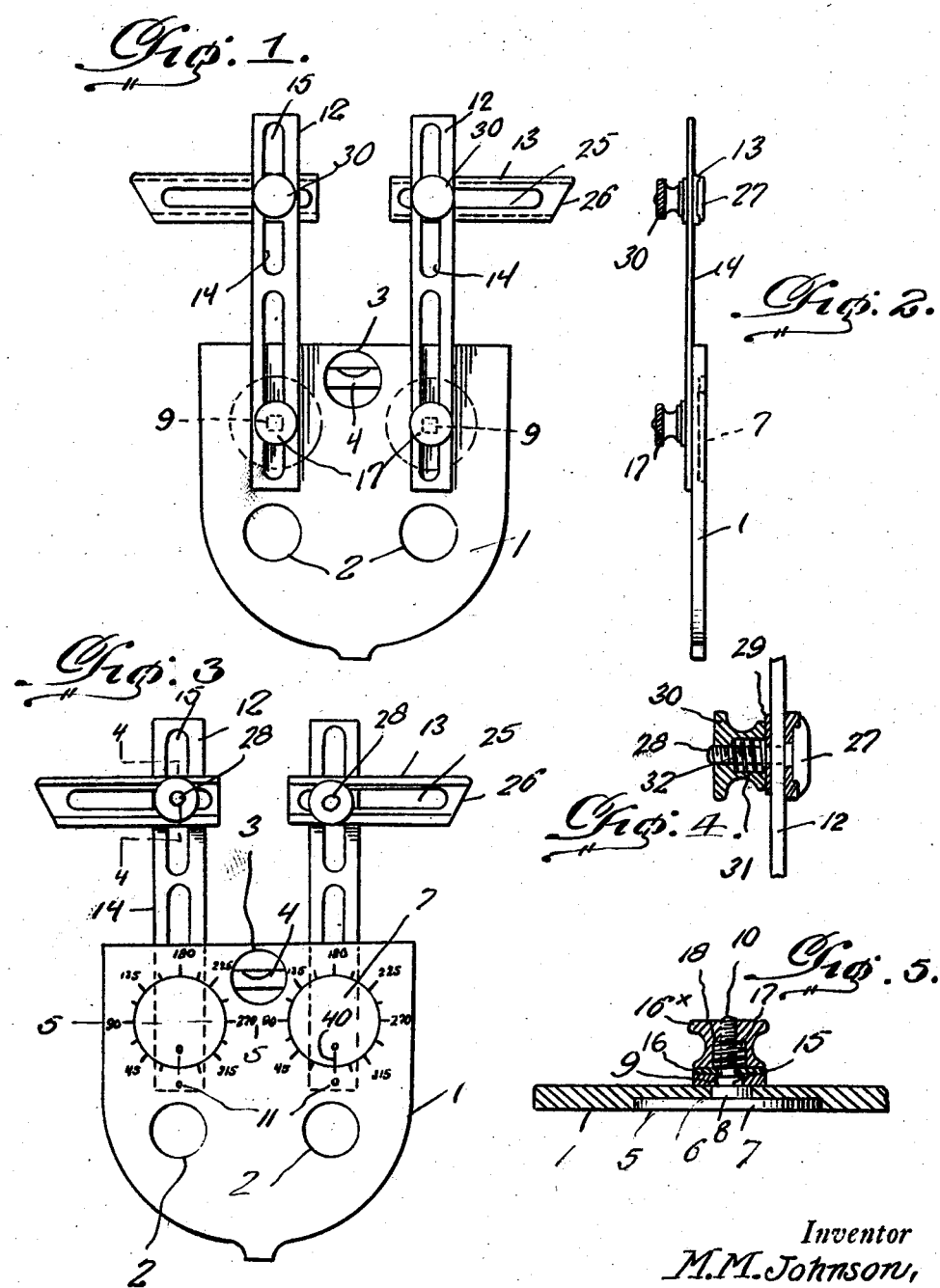

1,630,299

UNITED STATES PATENT OFFICE.

MILTON M. JOHNSON, OF CLEBURNE, TEXAS.

COMBINATION GAUGING DEVICE.

Application filed March 3, 1926. Serial No. 91,978.

My present invention has to do with gauging tools or devices, and contemplates the provision of a peculiar and advantageous gauging device, susceptible of being readily manipulated, and possessed of a wide range of usefulness as hereinafter set forth.

To the attainment of the foregoing the invention consists in the improvement as hereinafter described and definitely claimed.

In the accompanying drawings forming part of this specification:—

Figure 1 is a face view of the device constituting the best practical embodiment of my invention of which I am cognizant.

Figure 2 is an edge elevation of the device.

Figure 3 is a rear elevation of the device.

Figure 4 is an enlarged detail vertical section taken in the plane indicated by the line 4—4 of Figure 3.

Figure 5 is an enlarged detail horizontal section taken in the plane indicated by the line 5—5 of Figure 3.

Similar numerals of reference designate corresponding parts in all of the views of the drawings.

Among other elements my novel gauging device comprises a body 1 having finger holes 2 to facilitate manipulation thereof, and also having, by preference, an aperture 3 in which is disposed a spirit level 4, the said spirit level 4 being preferably, though not necessarily, comprised in my improvement.

In the rear side of the body 1, I provide circular countersinks 5, and said countersinks 5 are in communication with circular apertures 6 of reduced size which extend through to the face of the body 1, Figure 5. Snugly arranged in and revoluble in the countersinks 5 are circular disks 7 with reduced journal portions 8 and also with reduced angular portions 9, Figures 1 and 5, from which extend screw shanks 10. As shown in Figure 3, the countersinks 5 are preferably graduated to 360 degrees. It will also be noted by reference to Figure 3 that zero points 11 are provided at the rear side of the base 1.

In addition to the body 1 my novel device comprises two long wings 12, and two short wings 13. Each of the wings 12 is provided with a slot 14 and a slot 15, the slot 14 being for the reception of the before mentioned angular portions 9 complementary to the disks 7 so that swinging of the wings 12 will be attended by turning of the disks 7.

Arranged about the screw shanks 10 and against the faces of the wings 12 are washers 16, and opposed to the said washers 16 are nuts 16˟ which are knurled and are recessed at 17 to receive coiled springs 18, the said springs being designed to prevent falling of the wings 12 to one side when the nuts 16˟ are loosened.

The short wings 13 are slotted at 25 and are recessed at their rear sides as designated by 26, and seated in the said recesses 26 of the wings 13 are angular bolt heads 27, the shanks of the bolts being designated by 28 and being extended through the slots 25 and 15 of the wings 13 and 12, respectively, and being also extended through washers 29 and nuts 30, the said nuts 30 being recessed as designated by 31 to receive coiled springs 32, designed to prevent casual movement of the parts when the nuts 30 are loosened.

The long wings 12 are provided with graduated scales such as illustrated in Figure 1, which scales are preferably similar to those of a six inch scale, and it will also be noted that pointers 40 are preferably provided on the revoluble disks 7.

It will be apparent from the foregoing that my novel device is of simple, inexpensive and compact construction, and yet is adapted to be employed as an angle gauge, a curvature gauge, a depth gauge, a compass, a width gauge and as inside and outside calipers, three point calipers, bevel protractor, square head, spirit level and trisquare.

In using the device as a compass, a scratch awl, or scriber is held at the end of one of the wings and the thumb screw complementary to said wing is loosened so as to permit of the wing being swung so that the scratch awl or scriber will describe the arc of a circle.

My novel device may be used as a level by turning the base up on the edge parallel to the level glass.

My device is also adapted to be used as a depth gauge and when it is to be so used, the short wings are removed and the long wings are adapted longitudinally to the depth required and the thumb screws are tightened.

The extent to which the wings project from the base of the tool gives the measure of the depth.

My novel device is further adapted to be used to advantage in calipering the interior of a driving box with a view to obtaining the correct angles of the shoulders of the box. In the said use of the gauge it is placed in the driving box and set to the size of the driving box shoulders. The gauge as set is removed from the driving box and placed on the end of the driving box brass, and the angles of the shoulders of the driving box are scribed on the ends of the brass.

I have entered into a detailed description of the preferred embodiment of my invention in order to impart an exact understanding of said embodiment. I do not desire, however, to be understood as limiting myself to the specific construction and arrangement of parts as disclosed, my invention being defined by my appended claims within the scope of which modifications in structure and in arrangement may be made without departure from my invention.

Having described my invention, what I claim and desire to secure by Letters-Patent, is:—

1. In a gauging device and in combination, a body having countersinks in one side and journal apertures in communication with said countersinks, slotted wings arranged at the other side of the body, slotted wings designed to extend at angles to the first-named slotted wings, the second-named slotted wings being recessed at their rear sides, revoluble disks disposed in the countersinks of the body and having journal portions arranged in the journal apertures of the body and also having angular portions disposed in the slots of the first-named wings and threaded shanks extending from said angular portions, recessed nuts mounted on said shanks, washers mounted on said shanks and interposed between the first-named wings and the nuts, coiled springs housed in the nuts and interposed between the nuts and the washers, bolts having angular heads disposed in the recesses of the second-named wings and also having threaded shanks extending through the slots of said wings and also through the slots of the first-named wings, washers mounted on said shanks and arranged against the faces of the first-named wings, nuts mounted on the shanks and provided with recesses, and springs housed in the nuts and interposed between the washers and the nuts.

2. In a gauging device and in combination, a body having countersinks in one side and journal apertures in communication with said countersinks, slotted wings arranged at the other side of the body, slotted wings designed to extend at angles to the first-named slotted wings, the second-named slotted wings being recessed at their rear sides, revoluble disks disposed in the countersinks of the body and having journal portions arranged in the journal apertures of the body and also having angular portions disposed in the slots of the first-named wings and threaded shanks extending from said angular portions, recessed nuts mounted on said shanks, washers mounted on said shanks and interposed between the first-named wings and the nuts, coiled springs housed in the nuts and interposed between the nuts and the washers, bolts having angular heads disposed in the recesses of the second-named wings and also having threaded shanks extending through the slots of said wings and also through the slots of the first-named wings, washers mounted on said shanks and arranged against the faces of the first-named wings, nuts mounted on the shanks and provided with recesses, and springs housed in the nuts and interposed between the washers and the nuts; the first named wings being provided with scales, and the countersinks in the back of the body being graduated to 360 degrees.

In testimony whereof I affix my signature.

MILTON M. JOHNSON.